United States Patent [19]

Ackerman et al.

[11] Patent Number: 5,211,536
[45] Date of Patent: May 18, 1993

[54] BOLTLESS TURBINE NOZZLE/STATIONARY SEAL MOUNTING

[75] Inventors: Robert I. Ackerman, Mason; Alan Walker, Wyoming; Ronald E. Schlechtweg, Loveland, all of Ohio

[73] Assignee: General Electric Company, Cincinnati, Ohio

[21] Appl. No.: 699,060

[22] Filed: May 13, 1991

[51] Int. Cl.⁵ .............................................. F01D 25/08
[52] U.S. Cl. ...................... 415/177; 415/190; 415/209.3; 415/189
[58] Field of Search .............. 415/185, 189, 190, 191, 415/209.2, 209.3, 209.4, 208.2, 210.1, 177

[56] References Cited

U.S. PATENT DOCUMENTS

| | | | |
|---|---|---|---|
| 4,171,930 | 10/1979 | Brisken et al. | 416/220 R |
| 4,277,222 | 7/1981 | Barbeau | 415/177 |
| 4,304,523 | 12/1981 | Corsmeier et al. | 416/221 |
| 4,768,924 | 9/1988 | Carrier et al. | 415/189 |
| 4,798,514 | 1/1989 | Pask | 415/115 |
| 4,815,933 | 3/1989 | Hansel et al. | 415/189 |
| 4,883,405 | 11/1989 | Walker | 415/137 |
| 4,890,981 | 1/1990 | Corsmeier et al. | 416/220 R |

*Primary Examiner*—Edward K. Look
*Assistant Examiner*—Mark Sgantzos
*Attorney, Agent, or Firm*—David L. Narciso; Jerome C. Squillaro

[57] ABSTRACT

The invention comprises the use of a split retaining ring cooperating with an inner nozzle support member to retain nozzle segments and a stationary seal without the use of threaded fasteners. Elimination of bolt heads from the rotor/stator cavity reduces windage losses and enables a shortening of the inner nozzle band overhang, reducing the requirement for high pressure cooling and cavity purge air.

15 Claims, 5 Drawing Sheets

BOLTLESS TURBINE NOZZLE/STATIONARY SEAL MOUNTING

The government has rights in this invention pursuant to Contract No. F33657-83-C-0281 awarded by the Department of the Air Force.

FIELD OF THE INVENTION

This invention relates generally to gas turbine engines, and, more particularly, to structure for mounting nozzle vane segments and a stationary seal on a nozzle support without use of bolts.

BACKGROUND OF THE INVENTION

Figure 1:
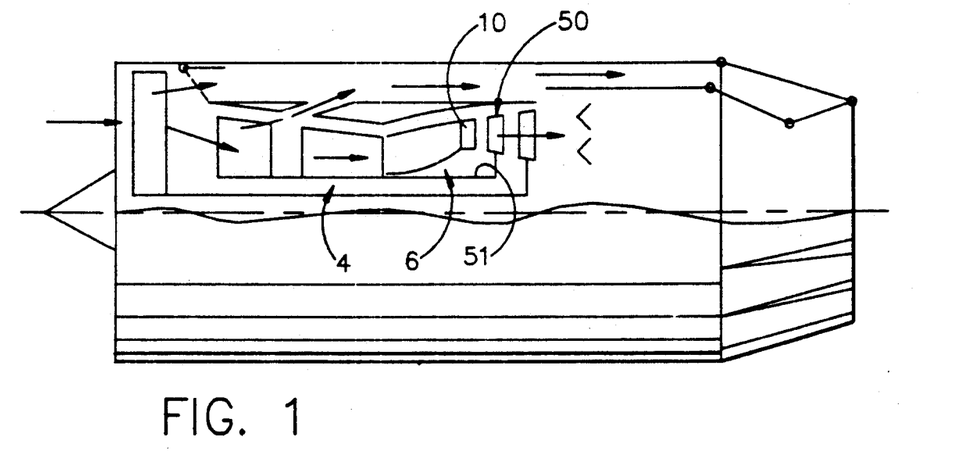
FIG. 1 is a schematic representation of a gas turbine engine.

High performance gas turbine engines include, as depicted schematically in FIG. 1 along longitudinal axis 101, a compressor 4, a combustor 6, a high pressure turbine nozzle 10, and a high pressure turbine 50. Core air is compressed by the compressor and discharged in axial flow as high pressure air to the combustor where fuel is injected and ignited. The hot, pressurized gases, which in modern engines can be in the range of 2,000° F., are allowed to expand through the high pressure turbine nozzle which directs the flow to turn the turbine, which is coupled by a rotor shaft 51 to drive the compressor. The core gases then exit the high pressure turbine providing energy downstream in the form of additional rotational energy extracted by additional and lower pressure turbine stages and/or thrust through an exhaust nozzle.

A portion of high pressure air can be bled from the compressor and used as high pressure cooling air to cool downstream apparatus, such as the combustor, nozzle, and turbine, and high pressure cavity purge air, but such high pressure cooling and cavity purge air consumes work from the turbine and is quite costly in terms of engine performance. Reducing the cooling and cavity purge air requirement allows a higher core air flow, reduces the energy expended by the turbine, increasing the energy available in the gas flow path.

In addition to using high pressure cooling air to protect the combustor and subsequent components from the effects of high temperature gases, such as high gas velocity oxidation and thermal fatigue, gas turbine engines can also employ protective coatings such as Thermal Barrier Coatings (TBC) to protect engine parts. Typically a TBC when applied to a metal substrate, protects the substrate from the effects of exposure to high temperature gases and act as an insulating layer between the hot gas flow path and the substrate. A thermal barrier coating system typically has multiple layers. Typically, such a system has at least a bond coat layer such as MCrAlY and a top coat such as a ceramic, like Yttria-stabilized zirconia layer, and may include additional layers.

A high pressure turbine nozzle, such as described in *Aircraft Gas Turbine Engine Technology*, 2d edition, (McGraw-Hill, 1979), pages 480–481 and incorporated herein by reference, typically comprises circumferentially adjacent paired vane segments, each vane extending radially outward from an inner to an outer band. The nozzle defines an annular core gas flowpath, turning the core flow to an angle for optimum performance of the turbine. The nozzle is segmented into the paired vanes to limit problems from differing thermal responses between the nozzle and supporting structure, creating gaps to allow for thermal growth of the segments. The nozzle uses high pressure cooling air for convection, impingement, and film cooling. Spline seals are placed in slots formed in the segments inner and outer bands circumferentially abutting surfaces to prevent leakage of hot core gases and uncontrolled loss of high pressure coolant air flow through these gaps.

The nozzle is positioned by seating the inner and outer bands of each nozzle segment in inner and outer support members, which transfer the pressure loads experienced by the nozzle to the engine casings and frame through the cold structures. The outer support member is not part of this invention. The inner band is typically mounted and retained to the inner nozzle support by means of bolts, pins or a combination of both at the inner band aft flange.

A gap exists at the interface between the high pressure nozzle inner band and turbine rotor blades. Any hot core gas leaking across this interface exits the working gas stream with a resultant loss of energy available from the gas turbine engine. Additionally, the turbine and nozzle structural members need to be protected from these hot core gases. To limit hot gas ingestion into this gap and to shield the inner nozzle support from high temperature gases, circumferential discourager seals are located in series, radially, typically including a nozzle inner band overhang, a high pressure turbine blade angel wing, and discourager seal(s) bolted to the nozzle support. Each discourager seal typically consists of circumferentially segmented members, creating split lines that permit leakage. A series of discourager seals create an air flow circuit with cavities in flow communication with each other. High pressure air that originated as high pressure cooling air can be vented to the rotor/stator interface, and used to purge these cavities of hot gases, the turbine acting to pump the air radially outward, adding sufficient energy to force the air through the discourager seals and to prevent ingestion of hot core gases. Such cavity purge air is a loss chargeable to the performance of the gas turbine engine and therefore the requirement for this flow should be minimized.

As the temperature of the cavity otherwise exposed to the inner nozzle support often exceeds the material capability of the support, discourager seals bolted to the support are typically thin, sheet metal seals that also act to insulate the support. Due to high thermal gradients, the seals are segmented to cut tangential stress, and are not integral with the support, which is typically not segmented, due to the differing thermal environment and thermal response characteristics. Additionally, many engines include a separate stationary seal between the rotor and the nozzle support which is also typically bolted in position.

Because the turbine rotates at high speeds while the nozzle assembly remains stationary, any structural protrusion into the rotor/stator cavity causes "windage losses." Such losses include the direct mechanical effect of work required to accelerate air to the speed of the rotor, which induces a drag effect on the rotor, and also the indirect effect of the resultant temperature rise in the purge air. High temperature air in the cavity needs to be avoided, thus requiring a higher purge flow. Every discontinuity in the flowpath environment causes windage losses, as the air is slowed and then must be reaccelerated. Segmentation of the discourager seal has been found to cause such losses, as does each bolthead or other threaded fastener exposed to the rotor/stator cavity.

One prior solution was to replace bolts with recessed Torx head screws and to protect the bolt heads with windage covers. However, because of the hostile temperature environment in this area, bolts and screws frequently become seized making disassembly without damage difficult. The parts count and complexity of assembly also made this solution unattractive.

Bolts or other fasteners which protrude into the rotor/stator cavity also affects how long the nozzle inner band overhang needs to be. The overhang is a hard area to cool and shortening the overhang would reduce the requirement for high pressure cooling air.

In addition to the above performance related problems encountered in using a segmented discourager seal and threaded fasteners to assemble the high pressure turbine nozzle, maintainability requirements for hot section structures such as the high pressure turbine nozzle that require periodic inspection and replacement necessitate an improved mounting arrangement that reduces the complexity and number of parts involved in assembly and disassembly.

SUMMARY OF THE INVENTION

It is therefore among the objectives of this invention to provide a design which reduces the requirement for high pressure air in the rotor/stator cavity by eliminating segmentation of the discourager seal and reducing the effect of fasteners protruding into the cavity. It is also an objective of this invention to provide a design which reduces complexity and parts count and combines the retention features of the nozzle and stationary seal, while avoiding the problem of bolt seizure.

These and other objectives are accomplished by a nozzle support structure in which the high pressure turbine nozzle support is integrated with the discourager seal to provide one integrated, circumferentially continuous piece with no split lines, the nozzle support having a groove for receiving a nozzle segment mounting flange and holes through the support and segment flange to receive mounting pins. A split retaining ring restrains the mounting pins and also retains a stationary seal radially inward of the mounting flange. TBC is applied to the circumferentially outer surface of the seal, insulating the support from the high temperature cavity during steady state operation, and slowing the heat flux into the seal portion during transient operation, as further described in co-pending application Ser No. 07/699061, Integral Turbine Nozzle Support and Discourager Seal, filed the same day as this application, May 13, 1991, assigned to the same assignee as this application, and incorporated herein by reference.

A split retaining ring turbine nozzle and stationary seal mounting apparatus in accordance with the present invention, especially when used in conjunction with the Integral Nozzle Support and Discourager Seal structure of copending application Ser. No. 07/699061, achieves weight and cost reductions by eliminating use of bolts for fastening nozzle segments, the stationary seal and discourager seal segments, significantly decreasing the parts count and complexity of nozzle assembly, enabling easier manufacturing and assembly, and improving maintainability. An integral nozzle support and discourager seal formed as one continuous 360 degree ring eliminates split lines, reducing hot gas ingestion. Eliminating bolt head protrusion into the rotor/stator cavity, with, in the preferred embodiment, only parts of the mounting pin heads exposed, reduces windage losses significantly. In addition, the axial length necessary for installation of the retaining means is shortened and the inner band overhang length may be shortened, further reducing high pressure cooling air requirements.

BRIEF DESCRIPTION OF THE DRAWINGS

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

A high performance gas turbine engine is schematically illustrated in FIG. 1, including a compressor 4, a combustor 6, a high pressure turbine nozzle 10, and a high pressure turbine 50.

Figure 2:
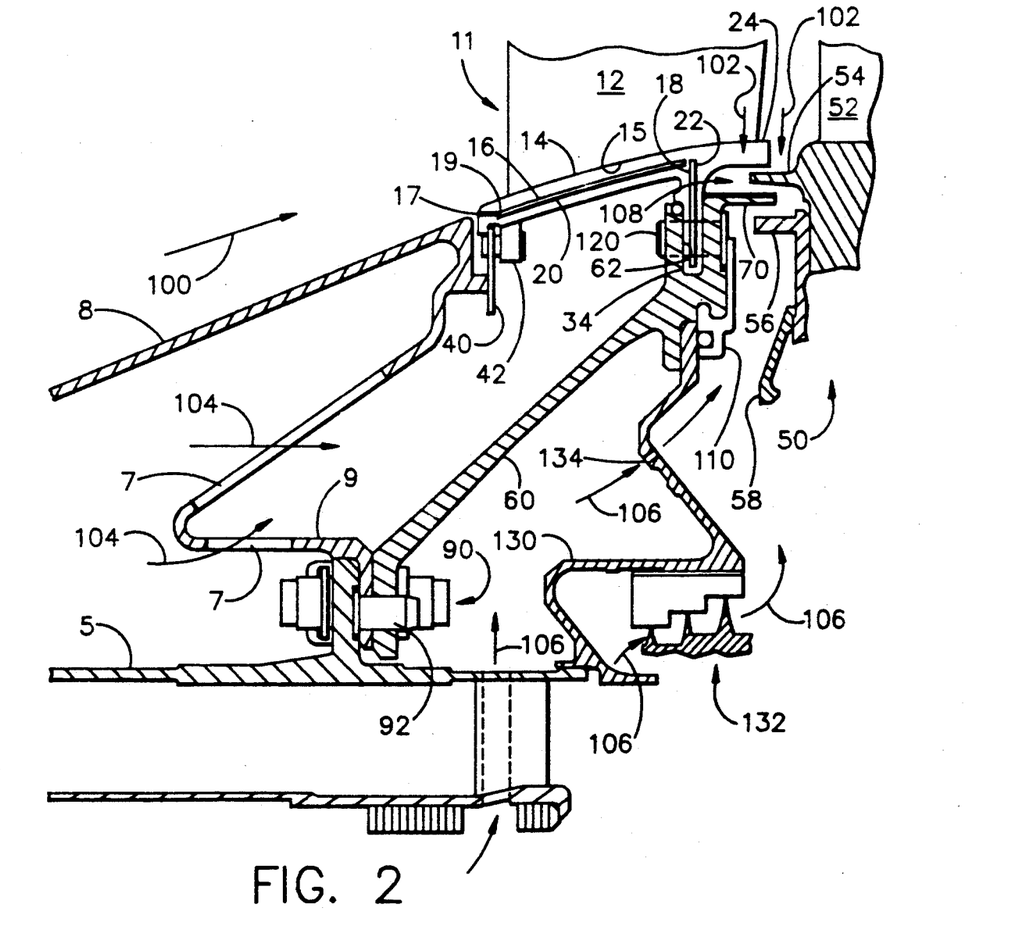
FIG. 2 is an elevational view in partial cross section of a high pressure turbine nozzle mounting arrangement which embodies the principles of this invention.

Referring now to FIG. 2, a cross section of a high pressure turbine nozzle mounting arrangement is shown in relation to adjacent sections of the engine. A nozzle segment 11 is mounted in the inner nozzle support 60 forward of the high pressure turbine 50. Nozzle segment 11 includes a high pressure turbine nozzle vane 12 joined to a nozzle inner band 14 with nozzle inner band aft flange 34 mounted in mounting slot 62 of inner nozzle support 60. Split retaining ring 110 holds pin 120 and stationary seal 130 in position. The inner nozzle support 60 has an aft extending discourager seal lip 70 and is attached to the combustor inner support 9 and cold structure 5 by a bolt 90 after being aligned by alignment pin 92.

Nozzle inner band 14 includes a nozzle inner band overhang 24 and slots 16 and 18 for retaining inner band axial and radial spline seals 20 and 22 respectively. Slot entrance 17 is narrower than slot 16 and can be used for insertion of spline seals 20 between nozzle segments 11. Once the seal is inserted past elbow 19, it will not back out of the entrance. Seal 40 is attached to mounting means 42 to prevent ingestion of hot core gases 100 and escape of high pressure cooling air flow 104.

A portion of a high pressure turbine blade 52 is shown with a high pressure turbine blade angel wing 54 shown extending forward into the buffer cavity 108 between the nozzle inner band overhang 24 and the discourager seal lip 70. A portion of a high pressure turbine blade retainer arm 58 is shown holding a high pressure turbine blade damper arm 56 which serves as another discourager seal against the high pressure turbine blade 52.

The combustor liner 8 and nozzle inner band flowpath surface 15 contain the hot core gas flow 100. There is some hot gas ingestion 102 between the circumferential nozzle segments at the nozzle inner band overhang 24 and through the gap between the overhang 24 and turbine blade 52. High pressure cooling air flows through openings 7 in the combustor inner support and into nozzle segments 11. High pressure cavity purge air 106 flow bleeds through hole 134 in stationary seal 130, mixing with high pressure cavity purge air that leaks through labyrinth seal 132.

Figure 3:
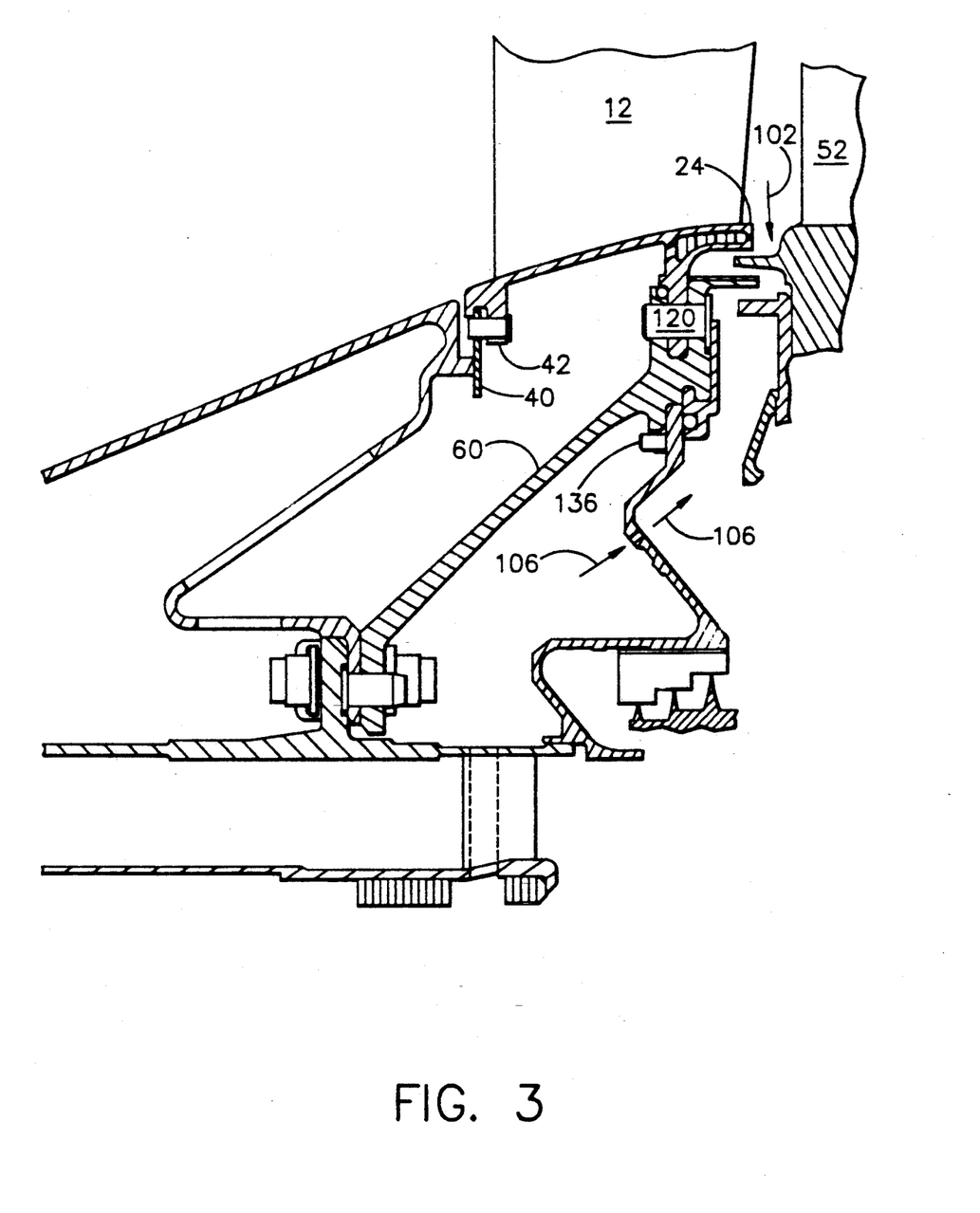
FIG. 3 is a second elevational view in partial cross section of the high pressure turbine nozzle mounting arrangement of FIG. 2 at a different angular location.
Figure 4:
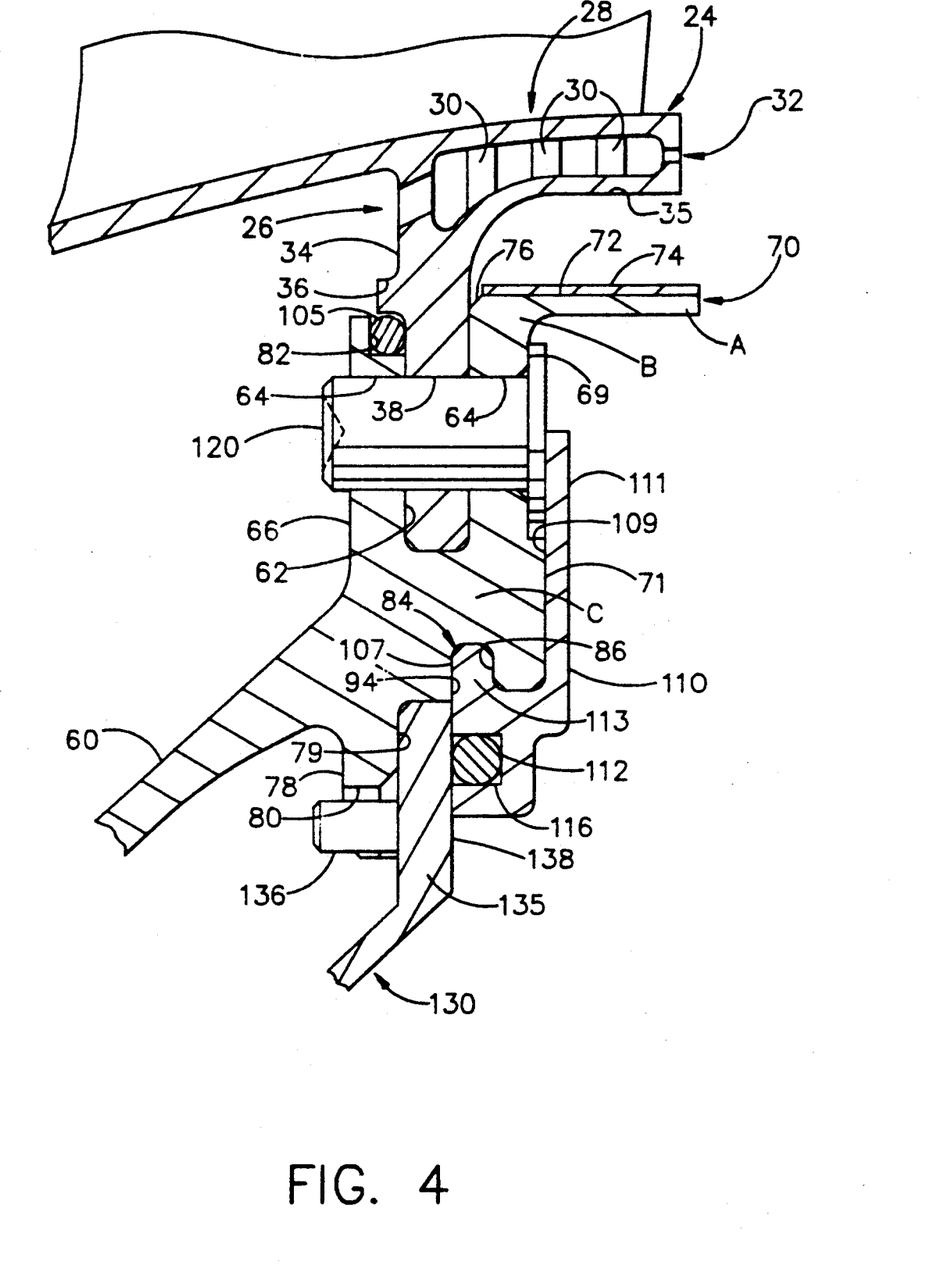
FIG. 4 is an enlarged view of a portion of FIG. 3, minus the turbine blade.

Referring to FIG. 3 and 4, an enlarged cross-sectional view shows the nozzle inner band overhang cooling circuit and a more detailed depiction of the discourager seal and nozzle support assembly.

Inner nozzle support 60 includes a generally conical section 41 with an inner surface 43 and an outer surface 45. The circumference of the conical section 41 surfaces 43, 45 radially increase from a longitudinal first forward end 47 to a second, aft, end 49. A first flange 53 extends circumferentially and radially inward from the conical section first end 47 and includes means for mounting the support 60 to the engine structure 5, including the holes for bolt 90 ad alignment pin 92. A second flange 55 extends circumferentially and radially outward from the conical section second end 49 to an outer circumference. The second flange 55 includes seal segment mounting means including a U-shaped circumferential groove 62 facing radially outward which serves as a mounting slot for receiving a turbine nozzle segment mounting flange 34. Groove 62 is defined between a first, forward, wall 66 and a second, aft, wall 68. Nozzle inner band overhang 24 includes high pressure cooling air entry port 26 leading to pin bank 28 wherein pins 30 conduct heat from the overhang 24 outer surfaces and are in turn cooled by convection, the cooling air exiting through trailing edge holes 32. Inner surface 35 of overhang 24 faces discourager lip seal 70. Nozzle inner band aft flange 34 has shoulder 36 that cooperates with groove 82 in support 60 to engage seal wire 105. Each nozzle segment inner band aft flange 34 includes holes 38 for mounting pins 120. Annular discourager seal lip 70 with chamfer 76 extends aft from inner nozzle support 60 second flange 55, comprising an outer annular surface 57 extending aft from the second flange radially outer circumference, and an inner annular surface 59. Annular discourager seal lip 70 further comprises substrate 72 of the same material as support 60 with a thermal barrier coating 74 applied on the outer annular surface 57.

Inner nozzle support 60 second flange 55 includes holes 64 through first wall 66 and second wall 68 for pin 120, which is engaged by outer circumferentially planar face 69 of support 60 and flange 111 of split retaining ring 110. Radially inward extending third flange 78 has outer surface 79 which cooperates with split retaining ring 110 to engage flange 135 of stationary seal 130. Third flange 78 has four circumferentially located slots 80 which engage stationary seal antirotation tabs 136 to prevent seal 130 from rotating during engine operation.

Split retaining ring 110 retains the assembly by having surface 109 of flange 111 engage the flat outer surface 124 of the head 122 of pin 120 and the inner circumferentially planar face 71 of support 60, With a second surface 107 of ring 110 engaging stationary seal flange 135 circumferentially planar surface 138 and circumferentially planar surface 94 extending radially inward from circumferential, radially inward facing groove 86. Hook section 113 of ring 110 engages circumferential groove 86 formed in support 60 by hook section 84 of support 60. A shear wire 112 inserted in groove 116 cut in surface 107 also engages seal surface 138.

Figure 5:
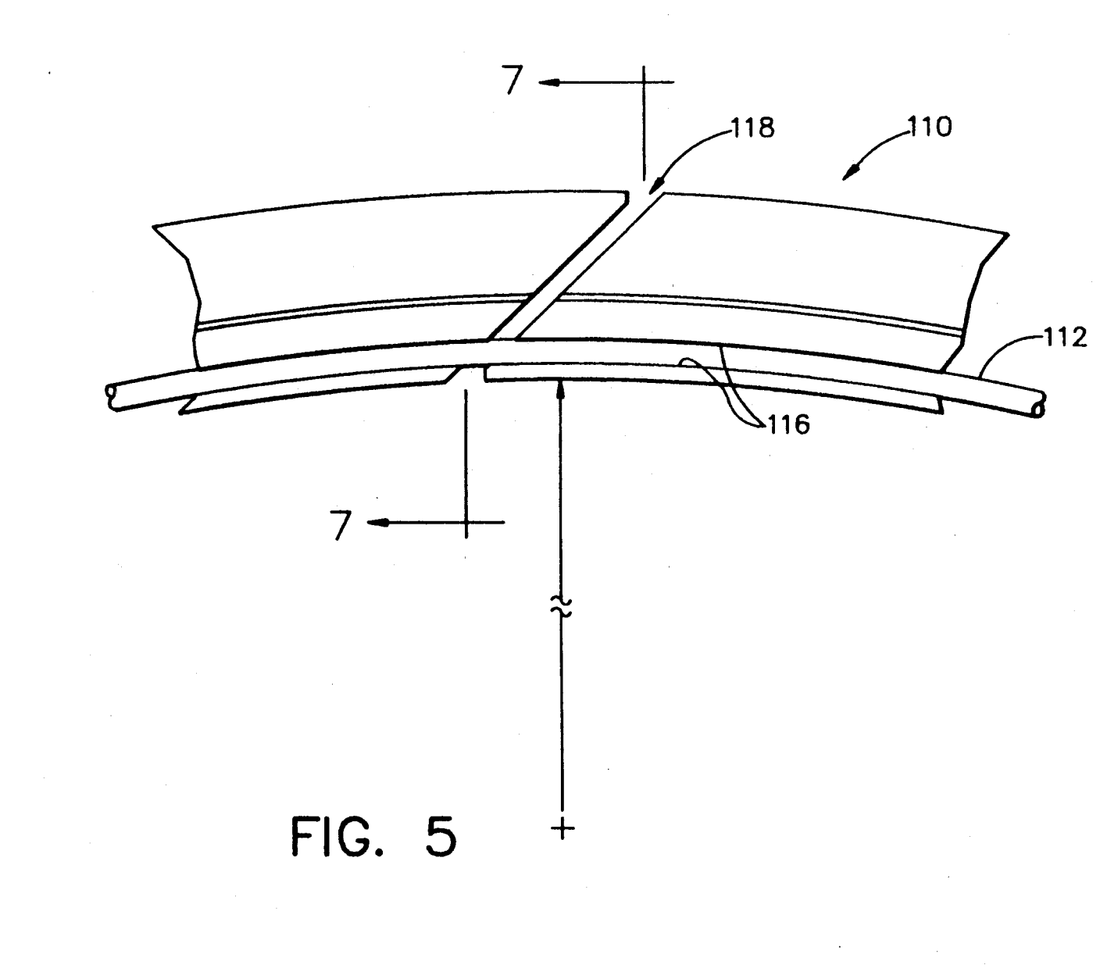
FIG. 5 is a partial elevational view of the split ring retention means used in the high pressure turbine nozzle mounting arrangement of FIG. 2.
Figure 6:
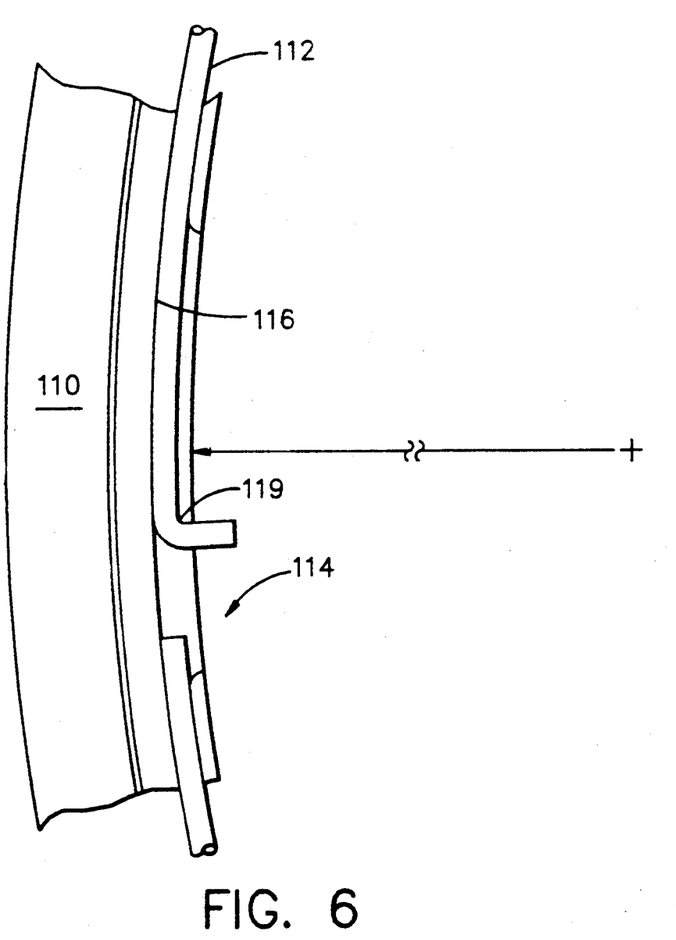
FIG. 6 is a second partial elevational view of the split retention ring at a position 90° offset from FIG. 5.
Figure 7:
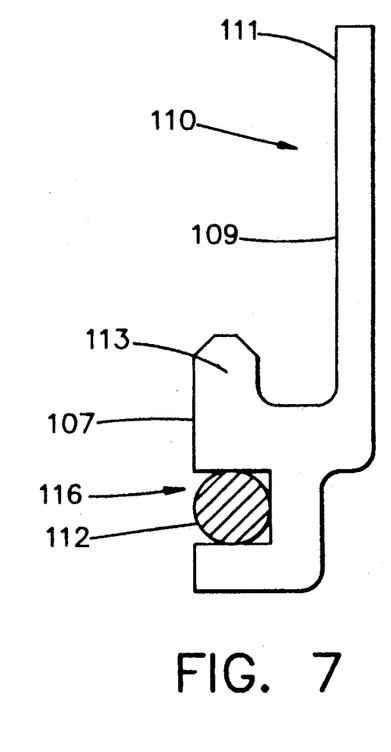
FIG. 7 is an enlarged cross sectional view of the split retention ring of FIG. 5.

FIG. 5 is an forward looking aft view of the section of the split retaining ring 110 including split 118, shown as being at an oblique angle to the radius of the ring. Groove 116 retains shear wire 112 which bridges split 118. FIG. 6 is a view 90° offset from FIG. 5 showing slot 114 for insertion of shear wire 112 into groove 116, with bend 119 in shear wire to prevent circumferential motion after installation. FIG. 7 is a side elevation view cut across plane 7—7 of FIG. 5, showing flange 111, shear wire 112 located in groove 116, and chamferred hook section 113.

Figure 8:
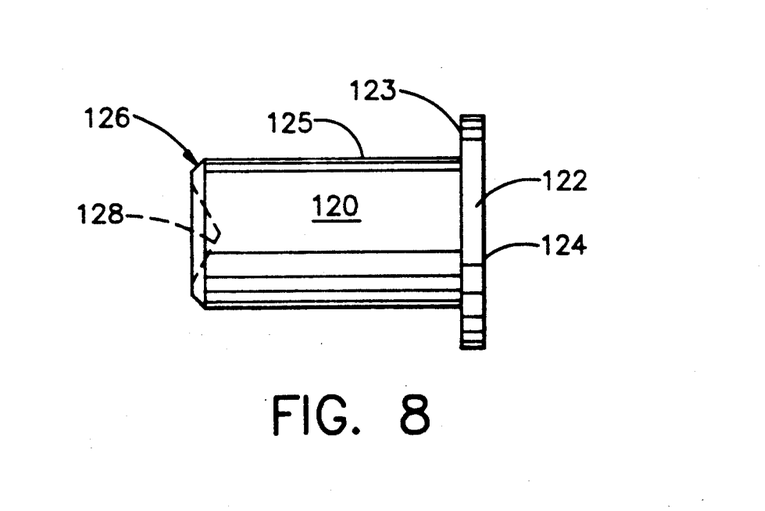
FIG. 8 is an elevational View of the attachment pin used in the high pressure turbine nozzle mounting arrangement of FIG. 2.

FIG. 8 is an elevational view of attachment pin 120 showing head 122, flat inner surface 123 which contacts support 60, flat outer surface 124 which engages ring, and a shaft 121 having a cylindrical surface 125 which contacts surfaces defining holes 38 and 64. Chamfer 126 facilitates insertion in holes 38 and 64, and dimple 128 lessens the potential for tools damaging other parts if it is necessary to tap pin 120 in order to remove it.

In a preferred embodiment, the high pressure turbine nozzle 10 comprises a number of circumferentially adjacent paired nozzle vane segments 11, defining an annular hot core flow path, mounted on inner nozzle support 60 which is in turn connected to engine structural support members at bolts 90 throughout the circumference of the inner nozzle support 60. A number of alignment pins 92 serve to locate the support and thus the nozzle in relation to other sections of the engine.

The inner nozzle support 60 is formed as a continuous 360 degree circumferential ring with an annular discourager seal coated on its outer annular surface with a thermal barrier coating as more particularly described in co-pending application Ser. No. 07/699,061. Beneath the discourager seal lip 70 a circumferential aft facing groove is cut defining an outer circumferential planar face 69 with holes 64 cut transverse to the groove and across the mounting slot 62 for receiving pins 120 shaft 121, such that each pin 120 engages two surfaces defined by holes 64 in support 60 walls 66 and 68 and one surface defined by hole 38 in nozzle inner band aft flange 36. This mounting arrangement provides a better load transmission path than if the pin was cantileveredly mounted with only one contact surface in the support and aft flange. Additionally, the mounting slot also provides a better load path and better stability than a cantilevered mounting.

The groove defining the outer circumferential planar face 69 is the same depth as the height of the head 122 of pin 120, such that one flat surface can engage both the head of the pins and the inner circumferential planar face 71. The forward outward extending wall 66 includes a two sided groove 82 at the outer circumference which cooperates with a shoulder 36 in the nozzle inner band aft flange 34 to form a circumferential enclosure for retaining a seal wire 105 which prevents the loss of high pressure cooling air 104 during engine operation.

Assembly of the high pressure turbine nozzle is accomplished by inserting an inner band radial spline seal 22 into the radial slot 18 of adjacent turbine nozzle segments 10, and a seal wire along the inner nozzle support seal wire groove 82. Turbine nozzle segment 10 is then mounted with the inner band aft flange 34 inserted into the mounting slot 62. Pins 120 are then inserted through the outer circumferential planar face 69 of nozzle support 60 until the head of the pin 122 is flush with the inner circumferentially planar face 71 of support 60, the pin thus extending through the holes in the nozzle inner support fore and aft mounting walls 66 and 68. Once all nozzle segments have been circumferentially installed the split retaining ring 110 is installed to hold the pins and nozzle segments in place. The assembly as a whole is then turned over and nozzle inner band axial spline seals 20 are inserted in slots 16 until they are engaged by passing the elbow of the slot 19. Once all axially extending nozzle inner platform seals 20 have been installed, the assembly is turned back over and installed in the engine by aligning the inner nozzle support 60 with the aligning pins 92 and then installing bolts 90. The retaining ring 110 is then removed. The stationary seal 130 is installed with the four anti-rotation tabs 136, each 90° offset from each other, aligned in the appropriate slots 80 in the inner nozzle support radially inward extending flange 78. The split retaining ring 110 is then reinstalled and the retaining shear wire 112 is inserted in slot 114 and the wire is fed through the groove 116 in the split retaining ring 110 until it has at least passed the split 118 of the split retaining ring 110, thus locking the split retaining ring in place. In a preferred embodiment, the shear wire is preformed in an arcuate shape for easier installation.

During engine operation, hot core gases ingestion 102 can occur at the nozzle/turbine blade interface and between nozzle segments at the nozzle inner band overhang. High pressure cooling air 104 flows through the overhang 104 and convectively cools pins 30 which conduct heat from the overhang surfaces exposed to hot gases. As this is a difficult area to cool, any shortening of the overhang results in lessening the requirement for cooling air. Because the nozzle discourager seal 70 is one circumferentially continuous piece, leakage of hot core gases inward is essentially stopped in the buffer cavity 108. High pressure purge air 106 mixes in the buffer cavity with any ingested hot gases 102 and leaks outward back into the hot core gas flow at another circumferential location, creating a net flow outward from the annular buffer cavity. Because boltheads have been eliminated from the cavity and the nozzle discourager seal is integral with the nozzle support, and split lines from a segmented seal are eliminated, windage losses are decreased substantially. Further, by eliminating fasteners from the rotor/stator interface, the length of the inner nozzle band overhang can be reduced, in turn reducing the requirement for cooling air. Parts of the pin heads are still exposed in the preferred embodiment to ease manufacture, by cutting a groove defining the outer circumferential planar face instead of drilling holes along the face for seating the pin heads.

While the invention has been described in what is presently considered to be a preferred embodiment, other variations and modifications will become apparent to those skilled in the art. It is intended, therefore, that the invention not be limited to the illustrative embodiment but be interpreted within the full spirit and scope of the appended claims.

What is claimed is:

1. A turbine nozzle and stationary seal mounting means comprising:
   a nozzle segment having a nozzle inner band mounting flange;
   a nozzle support for receiving said mounting flange, with a surface exposed to high pressure cooling air;
   means for retaining said nozzle segment in said mounting support without the use of a threaded fastener;
   a stationary seal affixed to said nozzle support;
   a circumferential retaining ring having one split engaging said nozzle support, said means for retaining said nozzle in said mounting support, and said stationary seal.

2. The mounting means of claim 1 wherein the means for retaining said nozzle in said mounting support comprises a pin with a head engaging a surface of said nozzle support, and a shaft engaging a series of holes through the nozzle support and nozzle inner band mounting flange.

3. The mounting means of claim 1 wherein an annular discourager seal lip having a longitudinally extending circumferential surface coated with a thermal barrier coating is integral with the inner nozzle support.

4. The mounting means of claim 1 wherein the nozzle support has a seal antirotation slot and the stationary seal has an antirotation tab, and the antirotation tab is inserted in the antirotation slot to prevent rotation of the stationary seal during engine operation.

5. The mounting means of claim 1 wherein the circumferential retaining ring has a circumferential groove hook section, and the nozzle support has a circumferential mounting groove, wherein the hook section of the ring engages the nozzle support circumferential mounting groove.

6. The mounting means of claim 5 wherein said split retaining ring has an inner radius and an outer radius corresponding to radial inner and outer surfaces, and wherein the split is at an oblique angle to the radius of the ring.

7. The mounting means of claim 6 wherein said split retaining ring circumferential groove hook section is closer to the radial inner surface than the radial outer surface.

8. The mounting means of claim 1 wherein said split retaining ring has a forward circumferentially planar surface, an intermediate circumferentially planar surface, an aft circumferentially planar surface, an inner circumferential surface, an intermediate circumferential surface, and an outer circumferential surface, including an outward facing groove in the intermediate circumferential surface between the forward and intermediate circumferentially planar surfaces, forming a circumferentially extending hook for engaging the inner nozzle support.

9. The mounting means of claim 8 including a forward facing groove in the forward circumferentially planar surface of said split retaining ring for receiving a shear wire.

10. The mounting means of claim 9 including slots in said split retaining ring from the forward facing groove radially outward to the outer circumferential surface for enabling insertion of a shear wire into said forward facing groove.

11. The mounting means of claim 10 wherein said shear wire is formed in an arcuate shape.

12. The turbine nozzle and stationary seal mounting means of claim 11 wherein the split retaining ring forward circumferentially planar surface engages the stationary seal and nozzle support, the circumferentially extending hook engages a groove in the nozzle support, and the intermediate circumferentially planar surface engages the nozzle support and the nozzle segment mounting means.

13. The turbine nozzle and stationary seal mounting means of claim 12 wherein the means for retaining said nozzle segment in said mounting support comprises a pin with a head engaging a surface of said nozzle support, and a shaft engaging a series of holes through the nozzle support and nozzle inner band mounting flange.

14. The apparatus of claim 13, including means for preventing the escape of high pressure cooling air through the nozzle inner band and nozzle inner support.

15. A circumferential retaining ring for retaining a nozzle segment in a nozzle support and for retaining a stationary seal affixed to the nozzle support comprising:
- one split at an oblique angle to the radius of said ring;
- a surface for engaging means for retaining the nozzle segment;
- a surface for engaging the stationary seal;
- a circumferential groove hook section for engaging a circumferential mounting groove on the nozzle support.

* * * * *